(12) United States Patent
Hann et al.

(10) Patent No.: US 9,399,257 B2
(45) Date of Patent: Jul. 26, 2016

(54) METHODS FOR FORMING CERAMIC REINFORCED TITANIUM ALLOYS

(71) Applicant: HONEYWELL INTERNATIONAL INC., Morristown, NJ (US)

(72) Inventors: Brian Hann, Avondale, AZ (US); Daira Legzdina, Phoenix, AZ (US); Mark C. Morris, Phoenix, AZ (US); Donald G. Godfrey, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 173 days.

(21) Appl. No.: 14/254,352

(22) Filed: Apr. 16, 2014

(65) Prior Publication Data

US 2015/0298212 A1    Oct. 22, 2015

(51) Int. Cl.

| B22F 3/105 | (2006.01) |
|---|---|
| B22F 5/00 | (2006.01) |
| B22F 5/04 | (2006.01) |
| C22C 1/04 | (2006.01) |
| C22C 1/10 | (2006.01) |
| C22C 32/00 | (2006.01) |
| B33Y 10/00 | (2015.01) |

(52) U.S. Cl.
CPC ............... B22F 5/009 (2013.01); B22F 3/1055 (2013.01); B22F 5/04 (2013.01); C22C 32/00 (2013.01); *B33Y 10/00* (2014.12); *Y02P 10/295* (2015.11)

(58) Field of Classification Search
CPC .......... B22F 3/1055; B22F 5/009; B22F 5/04; B22F 2302/05; B22F 2302/10; B22F 2302/20; B22F 2302/205; C22C 1/0491; C22C 1/10; C22C 1/051; B33Y 10/00

USPC ................. 419/10, 12, 13, 14, 25, 53, 55
See application file for complete search history.

(56) References Cited

U.S. PATENT DOCUMENTS

| 4,832,982 A | 5/1989 | Mori et al. |
| 4,968,348 A | 11/1990 | Abkowitz et al. |

(Continued)

FOREIGN PATENT DOCUMENTS

| CN | 103008657 A | 4/2013 |
| CN | 103060591 A | 4/2013 |
| EP | 2586887 A1 | 5/2013 |

OTHER PUBLICATIONS

Derwent abstract of CN 103060591; Apr. 2013.*

(Continued)

*Primary Examiner* — Helene Klemanski
(74) *Attorney, Agent, or Firm* — Ingrassia Fisher & Lorenz, P.C.

(57) ABSTRACT

In accordance with an exemplary embodiment, a method of forming a ceramic reinforced titanium alloy includes the steps of providing, in a pre-alloy powdered form, a ceramic reinforced titanium alloy composition that is capable of achieving a dispersion-strengthened microstructure, directing a low energy density energy beam at a portion of the alloy composition, and forming a ceramic reinforced titanium alloy metal having ceramic particulates of less than 10 μm on a weight-average basis. The step of forming includes the sub-steps of withdrawing the energy beam from the portion of the powdered alloy composition and cooling the portion of the powdered alloy composition at a rate greater than or equal to about $10^{6\circ}$ F. per second, thereby forming the ceramic reinforced titanium alloy metal.

20 Claims, 3 Drawing Sheets

(56) References Cited

U.S. PATENT DOCUMENTS

| | | | |
|---|---|---|---|
| 5,366,570 A * | 11/1994 | Mazur | C22C 1/0458 148/421 |
| 5,449,536 A | 9/1995 | Funkhouser et al. | |
| 5,640,667 A | 6/1997 | Freitag et al. | |
| 6,024,792 A | 2/2000 | Kurz et al. | |
| 6,048,954 A | 4/2000 | Barlow et al. | |
| 6,269,540 B1 | 8/2001 | Islam et al. | |
| 6,402,476 B1 | 6/2002 | Bossmann et al. | |
| 7,311,873 B2 | 12/2007 | Moxson et al. | |
| 7,521,017 B2 | 4/2009 | Kunze et al. | |
| 7,540,996 B2 | 6/2009 | Bampton | |
| 8,728,388 B2 * | 5/2014 | Morris | B22F 3/1055 419/26 |
| 9,175,568 B2 * | 11/2015 | Ryan | B22F 3/1055 |
| 2004/0133298 A1 | 7/2004 | Toyserkani et al. | |
| 2009/0041609 A1 | 2/2009 | Duz et al. | |
| 2010/0040500 A1 | 2/2010 | Wang et al. | |
| 2010/0074788 A1 | 3/2010 | Moxson et al. | |
| 2011/0106290 A1 | 5/2011 | Hovel et al. | |
| 2012/0000072 A9 | 1/2012 | Morrison et al. | |
| 2013/0280547 A1 | 10/2013 | Brandl et al. | |
| 2014/0271322 A1 * | 9/2014 | Godfrey | B22F 3/1055 419/25 |
| 2015/0024233 A1 * | 1/2015 | Gunther | B22F 3/1055 419/53 |
| 2015/0093279 A1 * | 4/2015 | Kington | B22F 3/1055 419/19 |
| 2015/0298212 A1 * | 10/2015 | Hann | B22F 5/009 419/12 |

OTHER PUBLICATIONS

Derwent abstract of CN 103008657; Apr. 2013.*

Wang et al.; "Optimization of the LENS process for steady molten pool size"; Materials Science and Engineering A 474; pp. 148-156; 2008, no month available.*

Hofmeister et al.; "Investigating Solidification with the Laser-Engineered Net Shaping (LENS) Process"; Jul. 1999 (vol. 51, No. 7) JOM; 6 pages.*

LENS Superalloy Datasheet from OPTOMEC; Jan. 2015; 2 pages.*

Metal Additive Manufacturing; Lawrence Livermore National Laboratory; https://manufacturing.llnl.gov/additive-manufacturing/metal-additive-manufacturing; no date available; 6 pages.*

Megahed et al.; "Metal additive-manufacturing process and residual stress modeling"; Integrating Materials and Manufacturing Innovation, a SpringerOpen Journal; 2016, no month available; 33 pages.*

Extended EP search report for EP 15162296.6-1353 dated Sep. 15, 2015.

Kurz, W., et al.; Rapid solidification processing and microstructure formation; Materials Science and Engineering A: Structural Materials: Properties, Microstructures and Processing; vol. 179-180, May 1, 1994.

Bush, R.W., et al.; Elevated temperature characterization of electron beam freeform fabricated Tl—6Al—4V and dispersion strengthened Tl—8Al—1Er; Materials Science and Engineering A 554 (2012) 12-21.

Walker, J., et al.; Fabrication of Fe—Cr—Al Oxide Dispersion Strengthened PM2000 alloy using Selective Laser Melting; University of Liverpool, Department of Engineering, Brownlow Hill, Liverpool, L69 3GH, UK.

Extended EP search report for EP 14184849.9-1353/2857125 dated Mar. 7, 2015.

USPTO Office Action, Notification date Dec. 14, 2015; U.S. Appl. No. 14/043,994.

USPTO Notice of Allowance for U.S. Appl. No. 14/043,994, date mailed Apr. 13, 2016.

Wang, et al.; "Optimization of the LENS Process for Steady Molten Pool Size"; Materials Science and Engineering A 474; pp. 148-156; 2008. no month available.

Metal Additive Manufacturing; Lawrence Livermore National Laboratory; Https://manufacturing.llni.gov/additive-manufacturing/metal-additive-manufacturing; no date available; 6 pages.

Megahed et al.; "Metal Additive-Manufacturing Process and Residual Stress Modeling"; Integrating Materials and Manufacturing Innovation, a Springer Open Journal; 2016; no month available; 33 pages.

* cited by examiner

US 9,399,257 B2

METHODS FOR FORMING CERAMIC REINFORCED TITANIUM ALLOYS

TECHNICAL FIELD

Embodiments of the present disclosure generally relate to metal alloys for use in aerospace applications, and more particularly relate to improved methods for forming ceramic reinforced titanium alloys.

BACKGROUND

Turbine engines are used as the primary power source for various kinds of aircraft and other vehicles. The engines may also serve as auxiliary power sources that drive air compressors, hydraulic pumps, and industrial electrical power generators. Most turbine engines generally follow the same basic power generation procedure. Compressed air is mixed with fuel and burned, and the expanding hot combustion gases are directed against stationary turbine vanes in the engine. The vanes turn the high velocity gas flow partially sideways to impinge onto turbine blades mounted on a rotatable turbine disk. The force of the impinging gas causes the turbine disk to spin at high speed. Jet propulsion engines use the power created by the rotating turbine disk to draw more air into the engine, and the high velocity combustion gas is passed out of the gas turbine aft end to create forward thrust. Other engines use this power to turn one or more propellers, electrical generators, or other devices. Because fuel efficiency increases as engine operating temperatures increase, turbine engine blades and vanes are typically fabricated from high-temperature materials, such a high-temperature metal alloys.

As gas turbine engine performance requirements continue to push for improved fuel economy and power density, the speeds and temperatures of the engines continue to rise to meet the thermodynamic requirements associated with the improved engine cycles. Thus, improved materials are needed to maintain component life at these elevated stress and temperature levels. It is known in the prior art to use ceramic reinforced titanium alloys for such applications. However, known prior art methods for the manufacture of such alloys, which utilize mechanical press and sintering, or hot isostatic press (HIP), or even laser engineered net-shaping (LENS), do not result in a metallurgical microstructure for optimal material properties and do not achieve an acceptable final component shape. In addition, these prior art fabrication methods are costly.

A particular example of such prior art methods is U.S. Pat. No. 7,521,017 B2 to Joseph M. Kunze et al. (issued Apr. 21, 2009). This document discloses the application of a laser deposition process (such as LENS) for the fabrication of discontinuously reinforced titanium alloy (DRTi) metal matrix composites. The application and utilization of pre-alloyed, in-situ metal alloy powder compositions is disclosed. Specifically, a Ti alloy powder (such as Ti-6Al-4V) containing about 0-35% (by weight) boron (B) and/or about 0-20% (by weight) carbon (C) additions for forming borides (TiB/TiB$_2$) and/or carbide (TiC) discontinuously reinforced titanium alloy metal matrix composites (DRTi's) as demonstrated with the commercially available Ti-6Al-4V+1.4B and Ti-6Al-4V+1.3B+0.6C compositions is disclosed. Kunze et al. further disclose the application and utilization of powder metallurgy blends containing about 0-40% (by volume) ceramic particle reinforcements such as alumina, silicon carbide, and/or boron carbide with the remaining volume comprising the metal matrix powder such as aluminum or an aluminum alloy, titanium or a titanium alloy, copper or a copper alloy, nickel or a nickel alloy, and/or iron or an iron alloy. The LENS process used in Kunze et al., however, does not achieve a sufficient cooling rate that would result in a desirable finely-dispersed microstructure of ceramic elements dispersed throughout the titanium matrix for high-temperature applications in the latest gas turbine engine designs.

Accordingly, it is desirable to provide improved methods for forming ceramic reinforced titanium alloys, resulting in an improved microstructure. Further, it is desirable to provide such methods that achieve cost savings over prior art methods. Furthermore, other desirable features and characteristics of the invention will become apparent from the subsequent detailed description and the appended claims, taken in conjunction with the accompanying drawings and this background of the invention.

BRIEF SUMMARY

In accordance with an exemplary embodiment, a method of forming a ceramic reinforced titanium alloy includes the steps of providing, in a pre-alloy powdered form, a ceramic reinforced titanium alloy composition that is capable of achieving a dispersion-strengthened microstructure, directing a low energy density energy beam at a portion of the alloy composition, and forming a ceramic reinforced titanium alloy metal having ceramic particulates of less than 10 μm on a weight-average basis. The step of forming includes the sub-steps of withdrawing the energy beam from the portion of the powdered alloy composition and cooling the portion of the powdered alloy composition at a rate greater than or equal to about $10^{6\circ}$ F. per second, thereby forming the ceramic reinforced titanium alloy metal.

In another exemplary embodiment, a method of forming a net or near net ceramic reinforced titanium alloy metal component of a gas turbine engine comprising the steps of providing, in a pre-alloy powdered form, a ceramic reinforced titanium alloy composition comprising a nitride that is capable of achieving a dispersion-strengthened microstructure, in a selective laser melting process, directing a low energy density energy beam at a portion of the alloy composition, and forming a ceramic reinforced titanium alloy metal having ceramic particulates of from 1 μm to 5 μm on a weight-average basis. The step of forming comprises the sub-steps of withdrawing the energy beam from the portion of the powdered alloy composition and cooling the portion of the powdered alloy composition at a rate greater than or equal to about $10^{7\circ}$ F. per second, thereby forming the net or near net ceramic reinforced titanium alloy metal gas turbine engine component.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments and implementations of the alloys and methods for the manufacture thereof described herein are exemplary embodiments provided to enable persons skilled in the art to make or use the invention and not to limit the scope of the invention, which is defined by the claims. Furthermore, there is no intention to be bound by any expressed or implied theory presented in the preceding technical field, background, brief summary, or the following detailed description.

Further, although certain embodiments described herein provide improved methods for forming ceramic reinforced titanium alloy components for use in aerospace applications, more particularly for use as gas turbine engine components, it will be appreciated that the methods described herein will be useful in any number of applications wherein components formed of such alloys have been used/would be useful. In particular, the methods described herein may find application in any of various implementations where it is desirable to employ light-weight alloys for high-temperature applications.

Figure 1:
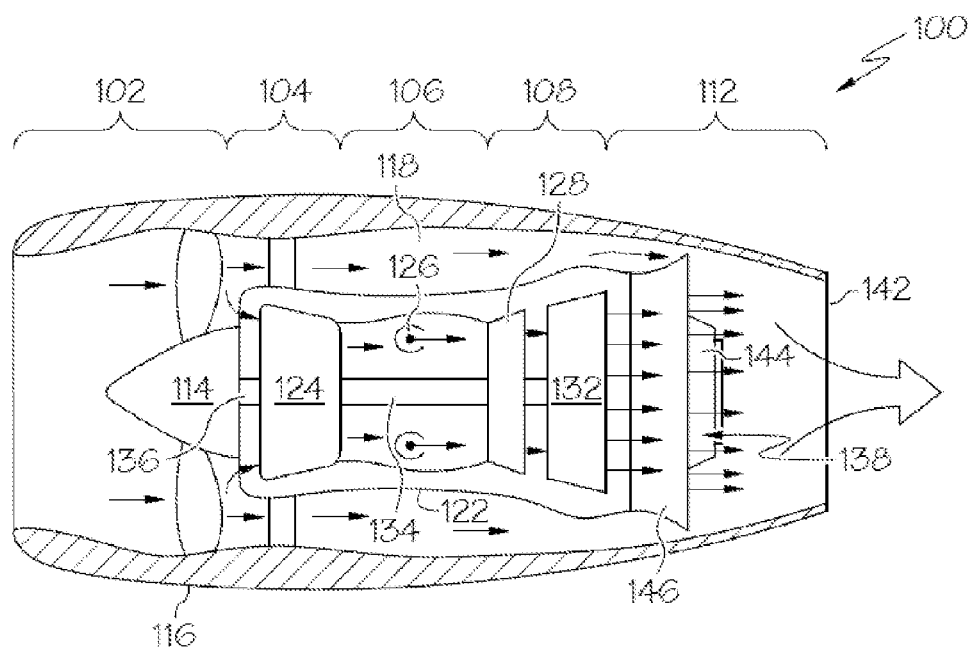
FIG. 1 depicts a functional block diagram of an embodiment of a gas turbine engine.

For example, with reference to FIG. 1, a functional block diagram of an exemplary turbofan gas turbine engine 100 is depicted. The depicted engine is a multi-spool turbofan gas turbine propulsion engine, and includes an intake section 102, a compressor section 104, a combustion section 106, a turbine section 108, and an exhaust section 112. The intake section 102 includes an intake fan 114, which is mounted in a nacelle assembly 116. The intake fan 114 draws air into the intake section 102 and accelerates it. A fraction of the accelerated air exhausted from the intake fan 114 is directed through a bypass flow passage 118 defined between the nacelle assembly 116 and an engine cowl 122. This fraction of air flow is referred to herein as bypass air flow. The remaining fraction of air exhausted from the intake fan 114 is directed into the compressor section 104.

The compressor section 104 may include one or more compressors 124, which raise the pressure of the air directed into it from the intake fan 114, and direct the compressed air into the combustion section 106. In the depicted embodiment, only a single compressor 124 is shown, though it will be appreciated that one or more additional compressors could be used. In the combustion section 106, which includes a combustor assembly 126, the compressed air is mixed with fuel supplied from a non-illustrated fuel source. The fuel and air mixture is combusted, and the high energy combusted fuel/air mixture is then directed into the turbine section 108.

The turbine section 108 includes one or more turbines. In the depicted embodiment, the turbine section 108 includes two turbines, a high pressure turbine 128, and a low pressure turbine 132. However, it will be appreciated that the engine could be configured with more or less than this number of turbines. No matter the particular number, the combusted fuel/air mixture from the combustion section 106 expands through each turbine 128, 132, causing it to rotate. As the turbines 128 and 132 rotate, each drives equipment in the engine via concentrically disposed shafts or spools. Specifically, the high pressure turbine 128 drives the compressor 124 via a high pressure spool 134, and the low pressure turbine 132 drives the intake fan 114 via a low pressure spool 136. The gas exhausted from the turbine section 108 is then directed into the exhaust section 112.

The exhaust section 112 includes a mixer 138 and an exhaust nozzle 142. The mixer 138 includes a center-body 144 and a mixer nozzle 146, and is configured to mix the bypass air flow with the exhaust gas from the turbine section 108. The bypass air/exhaust gas mixture is then expanded through the exhaust nozzle 142, providing forward thrust.

The present disclosure is directed to an improved method for forming ceramic reinforced titanium alloy components using a free-form manufacturing process. The components described herein may be used in, for example, gas turbine engine application, such as in the gas turbine engine described above with regard to FIG. 1 (exemplary components that may experience relatively high temperatures include compressor blades, compressor stators, impellers, compressor cases, combustor cases, turbine blades, turbine vanes, and turbine nozzles). There are three essential features of the presently disclosed embodiments that allow the alloys to achieve a finely-dispersed microstructure, namely of ceramic particles dispersed within the titanium matrix, that is sufficient to allow for their use in higher temperature gas turbine engine applications. The first essential feature is the cooling rate of the alloy after it has been heated above melting temperature. Namely, the cooling rate must be at least $10^{6\circ}$ F./second, and more preferably at least $10^{7\circ}$ F./second. The second essential feature is the particulate size of the ceramic materials dispersed within the titanium matrix. Namely, the particulate size (measured along the largest dimension) of the ceramic materials must be less than 10 μm on a weight-average basis, and more preferably from 1 μm to 5 μm. The third essential feature is the manufacture of the ceramic reinforced titanium alloy components in a "net" or "near-net" manner. Fabrication of components in a net or near-net manner avoids further processing of the alloy that could alter or damage the aforementioned microstructure (e.g., mechanical pressing, HIP, etc.). Fabrication in this manner also avoids the additional costs incurred of further processing steps.

To achieve the aforementioned essential features, embodiments of the present disclosure utilize a manufacturing process that incorporates a low energy density laser beam, referred to as Selective Laser Melting (SLM), Selective Laser Sintering (SLS), or a low energy electron beam, referred to as Electron Beam Melting (EBM) (together referred to herein as "low energy density energy beams"), in a powder tank. These "free-form" or "powder bed additive manufacturing" (PBAM) processes use a small, focused beam to build a component by fusing or melting one layer of powder to the fused or melted layer of powder directly beneath it. The powder bed additive manufacturing methods disclosed herein utilize SLM/SLS/EBM to build unique designs that are not practical and/or possible with prior technologies such as mechanical alloying, where costly and time-consuming tooling and processes are required. The PBAM processes disclosed herein are able to achieve cooling rates of at least $10^{6\circ}$ F./second, for example on the order of $10^{7\circ}$ F./second. The PBAM processes disclosed herein are also able to produce a microstructure that includes ceramic particulates of less than 10 μm on a weight-average basis, and more preferably from 1 μm to 5 μm. Still further, the PBAM processes disclosed herein are able to manufacture alloy components in a net or near-net manner. As an additional matter, the PBAM process of the present disclosure does not need expensive and unique press and sintering tooling and equipment (and preferably the methods described herein do not include the use thereof) associated with the prior art processing and manufacturing methods.

In general, it is expected that, based on the teachings herein, a person having ordinary skill in the art will be able to design a component part, such as for use in a gas turbine engine, to conform for use in a wide variety of applications, as the selection of size, shape, etc. of working components is generally considered to be within the level of skill of a person having ordinary skill in the art. As such, the various possible implementations and uses of the improved methods described herein should not be considered limited to any of the embodiments presented herein.

Greater detail regarding the ceramic reinforced titanium alloys of the present disclosure will now be provided. As is known in the art, ceramic strengthening of titanium alloys is a method to disperse a second phase within a matrix material using micron or sub-micron-sized particles such as borides, carbides, or nitrides. If the dispersants are sized properly, they strengthen the base material by pinning dislocations. Larger dispersants are not as effective at preventing dislocation motions, and they may act as defects and prematurely promote crack initiation leading to subsequent component failure. The deficiencies in the prior art processes such as press and sinter methods, which hold the material at elevated stress and temperature, result in growth in the size of the ceramic reinforcement particles. Other processes such as LENS do not obtain ultra-high quench rates, which may also result in growth in the size of the ceramic reinforcement particles, as was discussed above regarding the disclosure of Kunze et al., for example.

Using a novel PBAM approach, it is now possible to create a manufacturing process to produce near-net shape components directly from ceramic strengthened powders that, until now, could only be produced using the prior art more expensive methods. PBAM is a manufacturing process that allows for the manufacturing of components layer-by-layer. The PBAM process allows for the elimination of expensive manufacturing processes associated with producing parts from press and sinter methods. The laser melting and subsequent rapid cooling of titanium alloy powders to produce a ceramic strengthened alloy via PBAM is a unique process to produce components even with intricate internal passages that are not possible using the prior art technologies like LENS. PBAM enables the manufacturing of components directly from pre-alloyed powders built by using a scanning laser to melt and solidify very thin (less than 0.001") layers of powder. The cooling rates achieved by utilizing this technology are as high as $10^{7\circ}$ F./second (depending upon build geometry, laser focal parameters, laser power and laser scanning speed) thus producing the desired microstructure directly in the part without the costs and complexities of prior art processing steps. The $10^{7\circ}$ F./second cooling rate eliminates any potential for dissolutioning of the ceramics or the potential for particle growth, which reduces the mechanical properties of the alloy. Accordingly, particles desirable remain at a size of less than 10 microns, for example between about 1 micron and 5 microns. Further, SLS/SLM/EBM are powder bed additive manufacturing processes that are used to produce complex geometries in a single operation without tooling. Prior art processing methods cannot produce detailed features of a geometry referred to as "net" or "near-net" as can the PBAM process.

In accordance with the present disclosure, the aforementioned PBAM process is performed using a pre-alloyed powder of a ceramic reinforced titanium. As known in the art, pre-alloyed powders include mixtures of the elements of the alloy in powdered form, provided in the appropriate stoichiometric ratio to form the desired alloy. Such pre-alloyed powders may include alpha, beta, alpha-2, and gamma titanium alloys or any combinations thereof Ceramic strengthening elements may include borides, carbides, or nitrides. Particularly preferred alloys include nitrides. Without being bound by theory, it is believed that the presence of nitrides in the alloy assists in maintaining desirable small ceramic particle sizes upon cooling. A particularly preferred alloy includes cubic boron-nitride (cBN) particles.

Other preferred reinforcement particles include alumina ($Al_2O_3$), silicon carbide (SiC), boron carbide ($B_4C$), and/or other suitable ceramics or inter-metallics. The volume fraction of reinforcements in a matrix may be approximately 0-40%, more preferably about 10-25%. For any of the above preferred embodiments of this invention, still other metal particles can be used including, but not limited to: magnesium, calcium, scandium, yttrium, lanthanum, zirconium, hafnium, vanadium, niobium, tantalum, chromium, molybdenum, tungsten, manganese, rhenium, ruthenium, osmium, cobalt, rhodium, iridium, palladium, platinum, silver, gold, zinc, cadmium, gallium, indium, silicon, tin, and lead. Also suitable are metal alloy particles that comprise a mixture of two or more suitable metals.

Greater detail is now provided regarding the powder bed additive manufacturing techniques that may be used in connection with the above-described pre-alloy powders, and that achieve the aforementioned essential features of the present disclosure. Suitable powder bed additive manufacturing processes use a small, focused beam to build a component by fusing one layer of powder to the layer of powder directly beneath it, thus using the underlying previously solidified layers as a heat sink to achieve high cooling rates in the currently deposited and melted layer. The heat input for the process is controlled with laser focal parameters, laser power, and laser scanning speed. The rapid solidification rate is controlled by the conduction from the currently melted layer to the underlying previously solidified layers. Thus, powder bed temperature, support structures, and PBAM build foundation are all designed and controlled to provide the necessary heat sink parameters to achieve the appropriate microstructure. The PBAM process enables parts to be formed to near-net where appropriate, which eliminates expensive machining costs associated with prior art processes.

Figure 2:
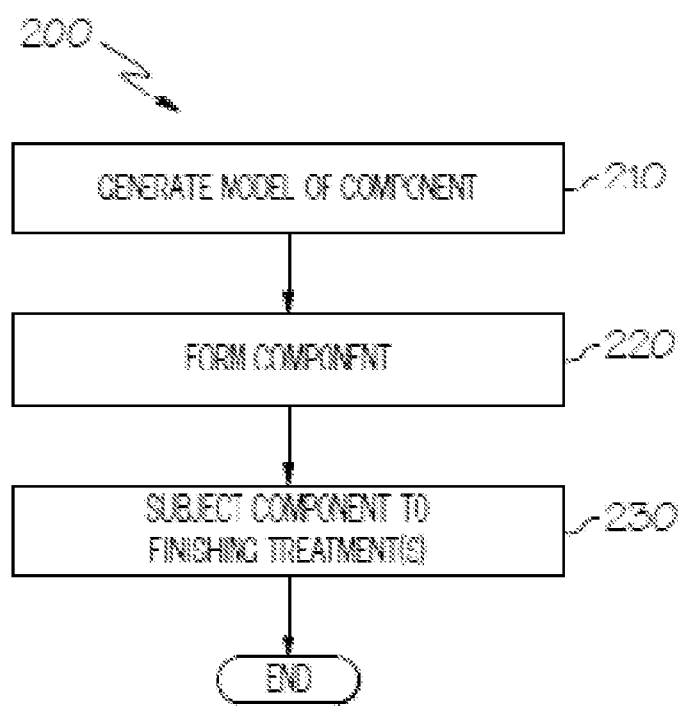
FIG. 2 is a flow diagram illustrating steps in a method of forming a ceramic reinforced titanium alloy component in accordance with the present disclosure.

FIG. 2 is a flowchart illustrating a method 200 for manufacturing a component, for example an aerospace or gas turbine engine component as described above with regard to FIG. 1, using a ceramic reinforced titanium alloy in accordance with an exemplary embodiment using, in whole or in part, powder bed additive manufacturing techniques based on low energy density energy beams. In a first step 210, a model, such as a design model, of the component may be defined in any suitable manner. For example, the model may be designed with computer aided design (CAD) software and may include three-dimensional ("3D") numeric coordinates of the entire configuration of the component including both external and internal surfaces. In one exemplary embodiment, the model may include a number of successive two-dimensional ("2D") cross-sectional slices that together form the 3D component. Of course, it is not necessary that a "near-net" component be formed using this process. Rather, it may simply be desired to produce a "block" of the ceramic reinforced titanium alloy using SLS/SLM/EBM. Accordingly, the present disclosure should not be considered as limited by any particular component design.

In step 220 of the method 200, the component is formed according to the model of step 210. In one exemplary embodiment, a portion of the component is formed using a rapid prototyping or additive layer manufacturing process. In other embodiments, the entire component is formed using a rapid prototyping or additive layer manufacturing process. Although additive layer manufacturing processes are described in greater detail below, in still other alternative embodiments, portions of the component may be forged or cast in step 220.

Some examples of additive layer manufacturing processes include: selective laser sintering in which a laser is used to sinter a powder media in precisely controlled locations; laser wire deposition in which a wire feedstock is melted by a laser and then deposited and solidified in precise locations to build the product; electron beam melting; laser engineered net shaping; and selective laser melting. In general, powder bed additive manufacturing techniques provide flexibility in free-form fabrication without geometric constraints, fast material processing time, and innovative joining techniques. In one particular exemplary embodiment, SLM is used to produce the component in step 220. SLM is a commercially available laser-based rapid prototyping and tooling process by which complex parts may be directly produced by precision melting and solidification of metal powder into successive layers of larger structures, each layer corresponding to a cross-sectional layer of the 3D component.

As such, in one exemplary embodiment, step 220 is performed with SLM techniques to form the component. However, prior to a discussion of the subsequent method steps, reference is made to FIG. 3, which is a schematic view of a SLM system 300 for manufacturing the component, for example one or more gas turbine engine components, in accordance with an exemplary embodiment.

Figure 3:
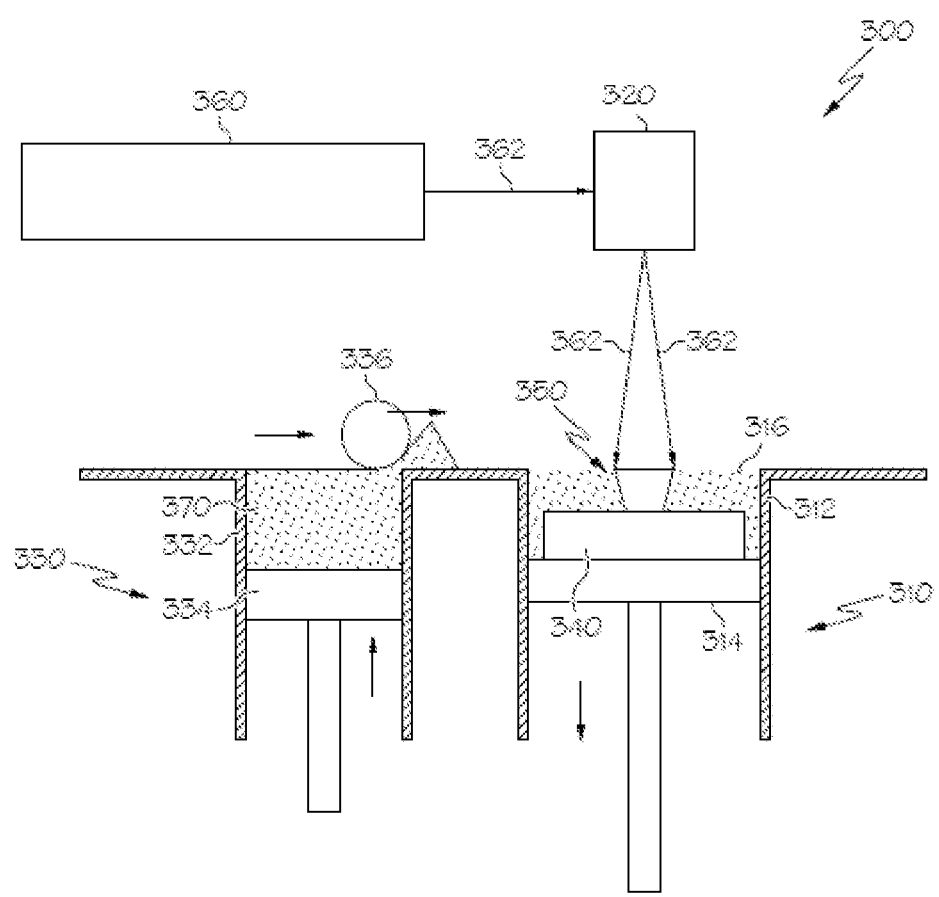
FIG. 3 is an exemplary powder bed additive manufacturing system suitable for use in forming a ceramic reinforced titanium alloy component in accordance with the present disclosure.

Referring to FIG. 3, the system 300 includes a fabrication device 310, a powder delivery device 330, a scanner 320, and a low energy density energy beam generator, such as a laser 360 (or an electron beam generator in other embodiments) that function to manufacture the article 350 (e.g., the component) with build material 370. The fabrication device 310 includes a build container 312 with a fabrication support 314 on which the article 350 is formed and supported. The fabrication support 314 is movable within the build container 312 in a vertical direction and is adjusted in such a way to define a working plane 316. The delivery device 330 includes a powder chamber 332 with a delivery support 334 that supports the build material 370 and is also movable in the vertical direction. The delivery device 330 further includes a roller or wiper 336 that transfers build material 370 from the delivery device 330 to the fabrication device 310.

During operation, a base block 340 may be installed on the fabrication support 314. The fabrication support 314 is lowered and the delivery support 334 is raised. The roller or wiper 336 scrapes or otherwise pushes a portion of the build material 370 from the delivery device 330 to form the working plane 316 in the fabrication device 310. The laser 360 emits a laser beam 362, which is directed by the scanner 320 onto the build material 370 in the working plane 316 to selectively fuse the build material 370 into a cross-sectional layer of the article 350 according to the design. More specifically, the speed, position, and other operating parameters of the laser beam 362 are controlled to selectively fuse the powder of the build material 370 into larger structures by rapidly melting the powder particles that may melt or diffuse into the solid structure below, and subsequently, cool and re-solidify. As such, based on the control of the laser beam 362, each layer of build material 370 may include unfused and fused build material 370 that respectively corresponds to the cross-sectional passages and walls that form the article 350. In general, the laser beam 362 is relatively low power to selectively fuse the individual layer of build material 370. As an example, the laser beam 362 may have a power of approximately 50 to 500 Watts, although any suitable power may be provided.

Upon completion of a respective layer, the fabrication support 314 is lowered and the delivery support 334 is raised. Typically, the fabrication support 314, and thus the article 350, does not move in a horizontal plane during this step. The roller or wiper 336 again pushes a portion of the build material 370 from the delivery device 330 to form an additional layer of build material 370 on the working plane 316 of the fabrication device 310. The laser beam 362 is movably supported relative to the article 350 and is again controlled to selectively form another cross-sectional layer. As such, the article 350 is positioned in a bed of build material 370 as the successive layers are formed such that the unfused and fused material supports subsequent layers. This process is continued according to the modeled design as successive cross-sectional layers are formed into the completed desired portion, e.g., the component of step 220.

The delivery of build material 370 and movement of the article 350 in the vertical direction are relatively constant and only the movement of the laser beam 362 is selectively controlled to provide a simpler and more precise implementation. The localized fusing of the build material 370 enables more precise placement of fused material to reduce or eliminate the occurrence of over-deposition of material and excessive energy or heat, which may otherwise result in cracking or distortion. The unused and unfused build material 370 may be reused, thereby further reducing scrap.

Any suitable laser and laser parameters may be used, including considerations with respect to power, laser beam spot size, and scanning velocity. The build material 370 is provided as a dispersion strengthened alloy in a pre-alloy powdered form with a composition that is capable of achieving a dispersion strengthened microstructure after appropriate processing. For example, the build material is any one of the pre-alloy titanium powders described above, and particularly preferred are the ones that include cBN ceramics. In general, the powder build material 370 may be selected for enhanced strength, durability, and useful life, particularly at high temperatures, although as described below, the powder build material 370 may also be selected based on the intended function of the area being formed. The powdered form of the alloy is produced by combining the various constituents (metals and other elements) of the alloy into a mixture, melting the mixture, and atomizing the melted mixture to form a powder, a process which is well-known in the art.

Returning to FIG. 2, at the completion of step 220, the article, i.e., the component, may be given a stress relief treatment and then is removed from the powder bed additive manufacturing system (e.g., from the SLM system 300). In optional step 230, the component formed in step 220 may undergo finishing treatments. Finishing treatments may include, for example, polishing and/or the application of coatings. If necessary, the component may be machined to final specifications. For example, in some embodiments in accordance with the present disclosure, aerospace components can be manufactured by the SLM process (optionally including machining) described herein.

Accordingly, the exemplary embodiments described herein provide improved methods for forming ceramic reinforced titanium alloy components. PBAM processing is an innovative, low cost enabler to produce ceramic strengthened titanium alloys, which cannot be economically produced with prior art elevated temperature/mechanical processes for the production of titanium alloys with optimal microstructure. Using the PBAM process, the desired ceramic strengthened titanium alloy microstructure and properties can be fabricated directly into a near-net component, without the need for prior art elevated temperature/mechanical processes. Elimination of the prior art press and sintering steps minimizes their potentially damaging effects on microstructure and properties, thus producing parts with properties equal to or exceeding those of components produced via other prior art methods. The PBAM process of the present disclosure does not need expensive and unique press and sintering tooling and equipment (and preferably the methods described herein do not include the use thereof) associated with the prior art processing and manufacturing methods.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. Various changes may be made in the function and arrangement of elements described in an exemplary embodiment without departing from the scope of the invention as set forth in the appended claims.

What is claimed is:

1. A method of forming a ceramic reinforced titanium alloy metal comprising the steps of:
   providing, in a pre-alloy powdered form, a ceramic reinforced titanium alloy composition that is capable of achieving a dispersion-strengthened microstructure;
   directing a low energy density energy beam at a portion of the alloy composition; and
   forming a ceramic reinforced titanium alloy metal having ceramic particulates of less than 10 μm, wherein the step of forming comprises the sub-steps of:
   withdrawing the energy beam from the portion of the powdered alloy composition; and
   cooling the portion of the powdered alloy composition at a rate greater than or equal to $10^{6}$° F. per second, thereby forming the ceramic reinforced titanium alloy metal.

2. The method of claim 1, wherein providing the pre-alloy powder comprises providing a pre-alloy powder comprising nitrides.

3. The method of claim 2, wherein providing the pre-alloy powder comprises providing a pre-alloy powder comprising cubic boron nitrides.

4. The method of claim 1, wherein forming the ceramic reinforced titanium alloy metal comprises forming a ceramic reinforced titanium alloy metal having ceramic particulates of from 1 μm to 5 μm.

5. The method of claim 1, wherein cooling the portion of the powdered alloy composition comprises cooling the portion of the powdered alloy composition at a rate greater than or equal to $10^{7}$° F. per second.

6. The method of claim 1, wherein directing a low energy density energy beam at a portion of the powdered alloy composition comprises subjecting the powdered alloy composition to a powder bed additive manufacturing procedure that employs a low energy density laser beam.

7. The method of claim 6, wherein subjecting the powdered alloy composition to the powder bed additive manufacturing procedure comprises subjecting the powdered alloy composition to a selective laser melting procedure.

8. The method of claim 1, wherein cooling the portion of the powdered alloy composition occurs immediately upon withdrawal of the energy beam.

9. The method of claim 8, wherein cooling the portion of the powdered alloy composition occurs as a result of the withdrawal of the energy beam.

10. The method of claim 1, further comprising directing the low energy density energy beam at a further portion of the alloy composition.

11. The method of claim 10, further comprising withdrawing the energy beam from the further portion of the powdered alloy composition.

12. The method of claim 11, further comprising cooling the further portion of the powdered alloy composition at a rate greater than or equal to $10^{6}$° F. per second, thereby forming additional dispersion-strengthened alloy metal.

13. The method of claim 12, wherein the steps of directing the low energy density energy beam, withdrawing the energy beam, and cooling the portion of the powdered alloy composition are performed as a result of a powder bed additive manufacturing process applied to the powdered alloy composition.

14. The method of claim 13, wherein the powder bed additive manufacturing process is selective laser melting.

15. The method of claim 1, wherein forming the dispersion strengthened alloy metal comprises forming a turbine engine component.

16. The method of claim 15, wherein forming the turbine engine component comprises forming a compressor blade, compressor stator, impeller, compressor case, combustor case, turbine blade, a turbine vane, or a turbine nozzle.

17. The method of claim 16, wherein forming the turbine engine component comprises forming the component in a net or near-net configuration.

18. A method of forming a net or near net ceramic reinforced titanium alloy metal component of a gas turbine engine comprising the steps of:
   providing, in a pre-alloy powdered form, a ceramic reinforced titanium alloy composition comprising a nitride that is capable of achieving a dispersion-strengthened microstructure;
   in a selective laser melting process, directing a low energy density energy beam at a portion of the alloy composition; and
   forming a ceramic reinforced titanium alloy metal having ceramic particulates of from 1 μm to 5 μm, wherein the step of forming comprises the sub-steps of:
   withdrawing the energy beam from the portion of the powdered alloy composition; and
   cooling the portion of the powdered alloy composition at a rate greater than or equal to $10^{7}$° F. per second, thereby forming the net or near net ceramic reinforced titanium alloy metal gas turbine engine component.

19. The method of claim 18, wherein providing the pre-alloy powder comprises providing a pre-alloy powder comprising cubic boron nitrides.

20. The method of claim 18, wherein forming the net or near net ceramic reinforced titanium alloy metal gas turbine engine component comprises forming a compressor stator, impeller, compressor case, combustor case, turbine blade, a turbine vane, or a turbine nozzle.

* * * * *